United States Patent [19]
Gottlieb

[11] Patent Number: 5,655,656
[45] Date of Patent: Aug. 12, 1997

[54] SLEEVE PACKAGE FOR COMPACT DISCS

[76] Inventor: Steven Gottlieb, 220 Central Park South, Apt. 2B, New York, N.Y. 10019

[21] Appl. No.: 553,817

[22] Filed: Nov. 6, 1995

Related U.S. Application Data

[63] Continuation of Ser. No. 255,568, Jun. 8, 1994, abandoned, which is a continuation of Ser. No. 985,596, Dec. 3, 1992, abandoned.

[51] Int. Cl.$^6$ .............................. B65D 85/57; B65D 5/38
[52] U.S. Cl. .................. 206/308.1; 206/232; 206/313; 229/125.125
[58] Field of Search ..................... 206/232, 304, 206/312, 313, 308.1; 229/23 BT, 125.125; 220/408, 410

[56] References Cited

U.S. PATENT DOCUMENTS

| | | | |
|---|---|---|---|
| 2,480,416 | 11/1949 | Modes . | |
| 2,580,141 | 12/1951 | Vidal | 206/232 |
| 2,827,223 | 3/1958 | Allison . | |
| 2,881,913 | 4/1959 | Kursh | 206/313 |
| 3,077,263 | 2/1963 | Froehlig | 206/313 |
| 3,279,594 | 10/1966 | Worthington, III . | |
| 3,302,844 | 2/1967 | Henry | 229/10 |
| 3,332,600 | 7/1967 | Guernsey | 229/125.125 |
| 3,337,119 | 8/1967 | Bowers et al. . | |
| 3,404,830 | 10/1968 | Rand . | |
| 3,516,698 | 6/1970 | Martins . | |
| 3,594,976 | 7/1971 | Jackson . | |
| 4,042,106 | 8/1977 | Smith | 206/313 |
| 4,325,507 | 4/1982 | Janhonen . | |
| 4,339,034 | 7/1982 | Panveno | 206/313 |
| 4,349,107 | 9/1982 | Pritchard . | |
| 4,365,708 | 12/1982 | Tyus . | |
| 4,429,826 | 2/1984 | Shedd | 229/9 X |
| 4,453,631 | 6/1984 | Mark | 206/313 |
| 4,473,153 | 9/1984 | Colangelo . | |
| 4,640,413 | 2/1987 | Kaplan et al. | 206/232 |
| 4,674,632 | 6/1987 | Friedman | 206/232 |
| 4,850,731 | 7/1989 | Youngs . | |
| 4,852,740 | 8/1989 | Sellar et al. . | |
| 4,863,032 | 9/1989 | Bothe et al. . | |
| 4,905,217 | 2/1990 | King et al. . | |
| 4,905,831 | 3/1990 | Bagdis et al. . | |
| 5,048,681 | 9/1991 | Henkel . | |
| 5,096,064 | 3/1992 | Rufo, Sr. et al. . | |
| 5,101,973 | 4/1992 | Martinez . | |
| 5,103,972 | 4/1992 | Ackeret | 206/232 |
| 5,147,036 | 9/1992 | Jacobs | 206/232 |

FOREIGN PATENT DOCUMENTS

| 2629801 | 10/1989 | France | 206/313 |
| 1206168 | 12/1965 | Germany | 206/313 |

*Primary Examiner*—Bryon P. Gehman
*Attorney, Agent, or Firm*—Levisohn, Lerner, Berger & Langsam

[57] ABSTRACT

A package for a compact disc and a booklet of lyrics. The package comprises an outer container and an inner sleeve with the inner sleeve being divided into two compartments, one for the compact disk and a separate compartment for the booklet. The inner sleeve is capable of being received within the outer container in either of two positions, one for long term storage and a second for short term storage, the latter providing easier access to the compact disk. A disc holding mechanism holds the disc in the inner sleeve.

5 Claims, 5 Drawing Sheets

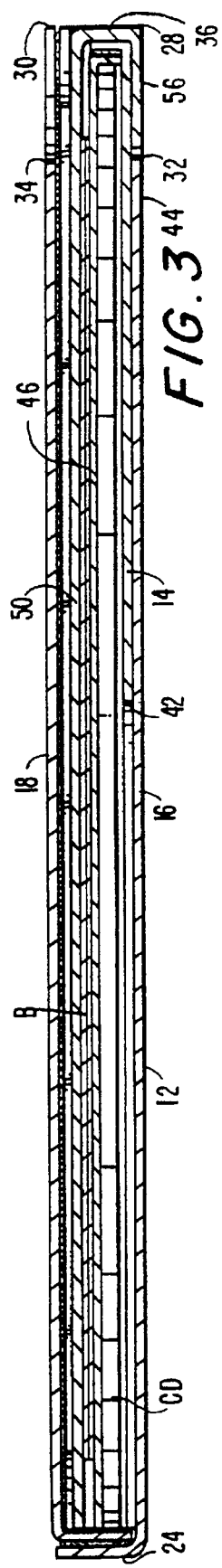
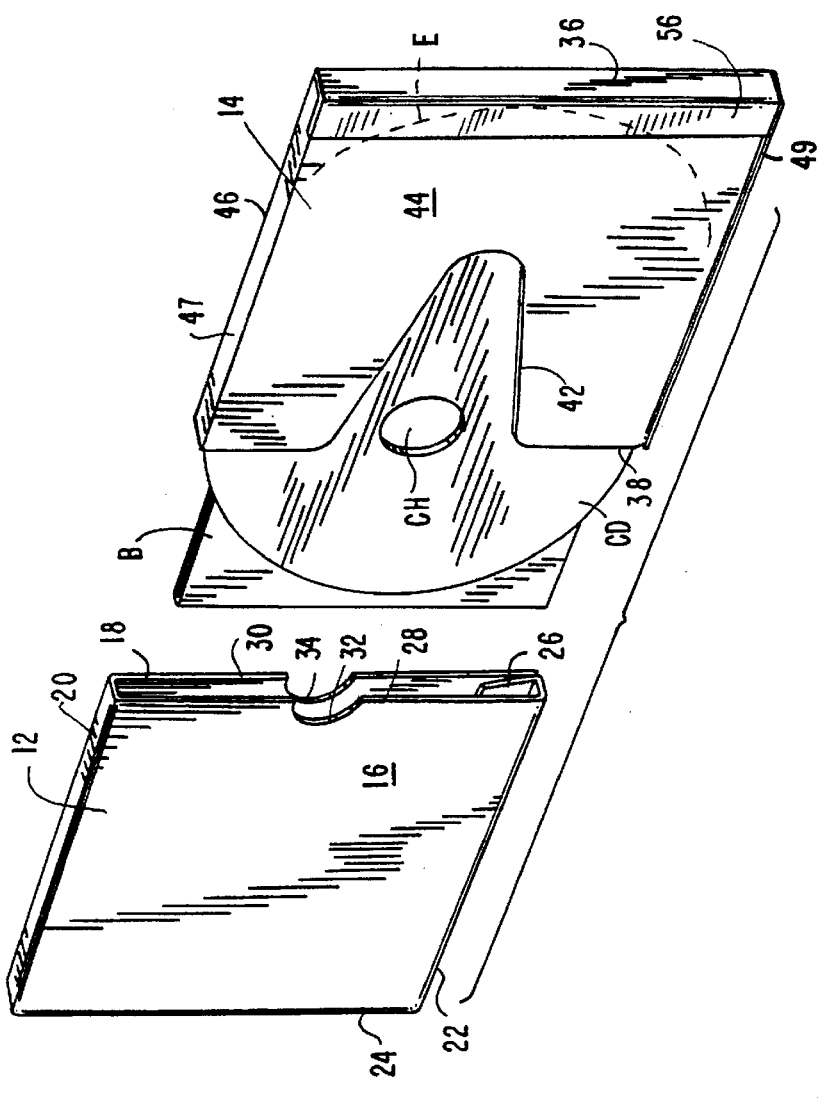

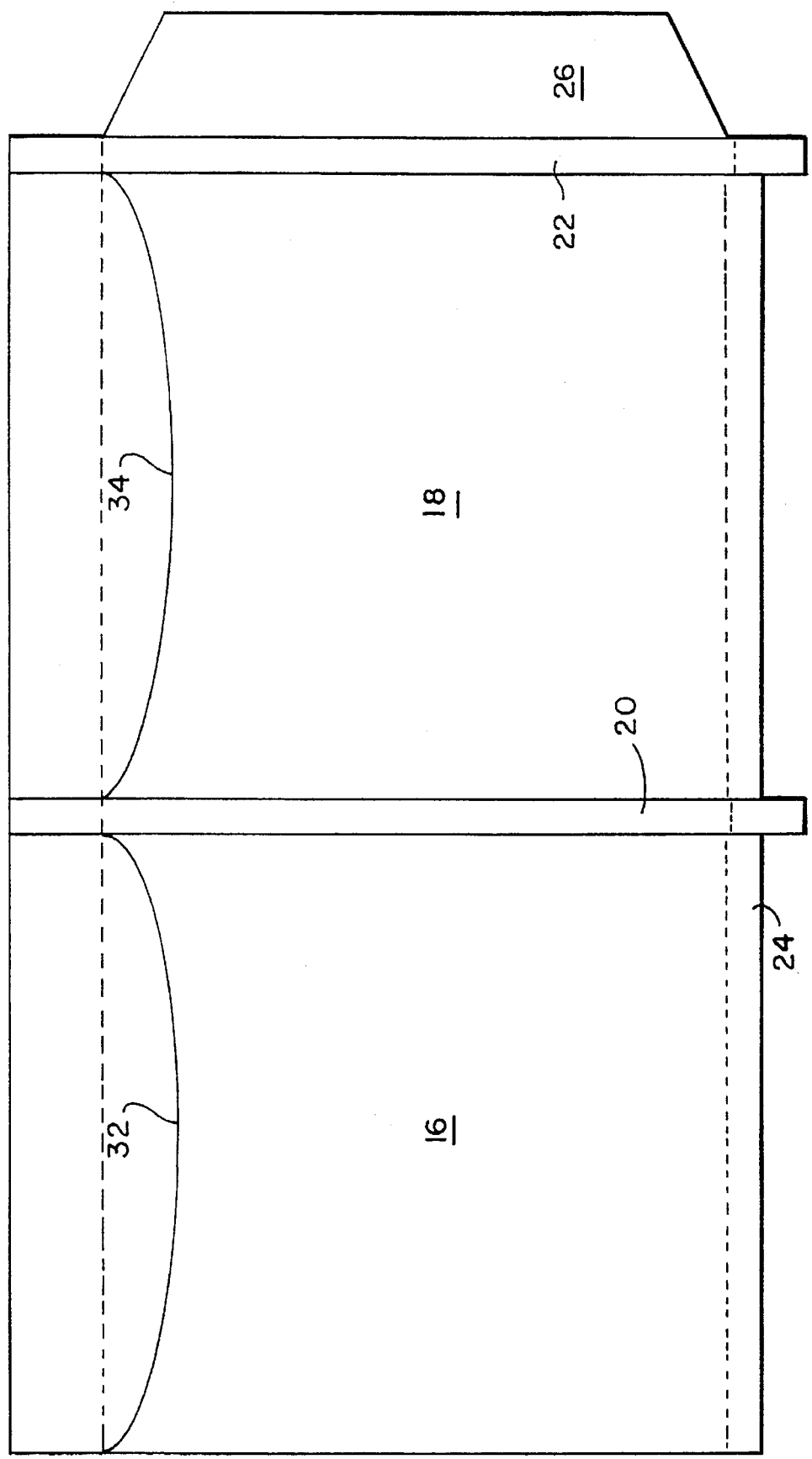

SLEEVE PACKAGE FOR COMPACT DISCS

This application is a continuation of application Ser. No. 08/255,568, filed Jun. 5, 1994, now abandoned, which is a continuation of U.S. Ser. No. 07/985,596 filed Dec. 3, 1992, now abandoned.

BACKGROUND OF THE INVENTION

The present invention relates to a package for circularly-shaped recording and playback media, preferably compact audio or video discs. The package can also be adapted for storage of floppy disks, comprising a circular disc held in a square-shaped housing. In their currently commercialized form, audio compact discs are in the range of about 5 inches in diameter. It will be appreciated that the present package can be utilized for other sizes, recorded formats and similar devices. The package is inexpensive to manufacture, highly aesthetic, functional and environmentally sound. The package is preferably made from coated card-stock material and is not much larger than the disc intended to be stored therein. Since it is manufactured from paper, it can carry visually pleasing and information-providing graphics.

The package of the present invention can be utilized with currently available five inch compact audio discs or, alternatively, it can be easily adapted for use in packaging micro discs, audio/visual discs, floppy discs, discs used with CD-ROM devices, etc. Of course, if any other visual or audio format or embodiment becomes commercially significant and is utilized with a circular recording and/or playback media, the package can be suitably adapted and configured for use therewith, without departing from the present invention. For illustrative purposes, however, the present invention will be described with respect to a standard five inch diameter compact audio disc, i.e., the disc currently used for audio recordings which can be played back for listening on standard compact disc machines as, for example, a Sony ® Discman. The size and dimensions, therefore, of a compact disc are specifically incorporated herein and believed well-known to those of skill in the art. The preferred embodiment of the present invention, in terms of size and dimensions will basically correspond thereto. The term "compact disc" or, merely, "disc" as used herein shall, therefore, be with specific reference to the five inch compact disc and in addition, shall include all sizes of discs as currently commercialized and those which may be commercialized in the future.

Basically, the present invention provides a two-piece cad-stock package for the compact disc. An outer container and an inner sleeve are provided. They constitute two separable components which slidingly engage to form a closed package for initial sale of the compact disc. The inner sleeve of the package is intended to hold the disc in a compartment. A separate compartment in the inner sleeve is also provided. It holds written information related to the disc as, for example, a libretto or information of interest related to the artist or the performance contained on the disc. The inner sleeve slides within the outer container and, with the disc and the written information carried by the inner sleeve, a closed package is provided which is substantially isolated from dust, liquids, the sun's rays and other harmful contaminants. The disc and written information can be stored in the package as it is initially configured or, alternatively, to make the disc and written information more easily and quickly accessible, the inner sleeve can be slidably received within the outer sleeve in a different orientation. In this orientation, the disc and written information are more easily and quickly accessible and, yet, the disc is still substantially isolated from external contaminants.

The use of an inner sleeve, intended to be inserted in either of one of two orientations within the outer protective container, allows the disc and the printed material to be stored in a contaminant free environment for initial sale and in between actual uses. When the purchaser and subsequent user desires to insert the compact disc into an appropriate playback machine, the disc can be easily removed from the inner sleeve. After playback, the compact disc can be restored back into the package. One orientation of the inner sleeve within the outer container provides a substantially contaminant free storage environment while the other orientation provides easier and quicker accessibility and, yet, it, too, is basically contaminant free.

In addition, as mentioned, the package includes a convenient and physically separate compartment in the inner sleeve for the selective inclusion by the seller of a booklet containing, for example, liner notes, lyrics or other printed/written information related to the material recorded on the compact disc. In addition, when the inner sleeve stores a square-shaped floppy computer disk the separate compartment for notes maintains written materials relate to the disk and, yet, eliminates writing directly on the disk's housing.

In its preferred embodiment, the package is made from a paper-like cardstock material which is environmentally sound. It represents an advance over the current hard plastic or "jewel" containers (currently used in connection with the sale of compact discs). The present invention is barely larger than the size of the compact disc sought to be contained therein. In addition, since the present invention is intended, in its preferred form, to be made from paper-like card stock material it can be directly printed upon. This, too, is in contrast to the jewel containers currently used with compact discs. Printing on the card stock increases the aesthetic attractiveness and functionality of the package. Also, a paperboard material, capable of receipt of graphic printing directly thereon, allows all of the thin spines of the package to have identifying graphics. This allows the package to be shelved independent of spine orientation and still graphics are visible.

DESCRIPTION OF THE PRIOR ART

Jewel cases, made from hard plastic, are currently the most popular manner of packaging compact discs. These hard plastic cases can break, develop cracks, may splinter or shatter and often snap apart. The sharp edges of the hard plastic "jewel" package are uncomfortable when placed in the pocket of a shirt or pair of pants, in back-packs, on car seats or anywhere in dose proximity to a person. Furthermore, the hard plastic packages are relatively cumbersome and unwieldy. They rattle and clack about noisily during automobile traveling. To many, they are difficult to open for removal of the disc.

Significantly, from a cost effectiveness standpoint, the compact discs, when packaged in the jewel containers, are heavy. The hard plastic casing significantly increases the weight of carrying a compact disc. That, of course, is a disadvantage to the consumer. A large number of compact discs packaged in the jewel boxes can be very heavy. Of more economic significance, the increased weight is an increased cost for shipping large numbers of compact discs in their ready for sale packaging.

Current jewel boxes often contain booklets which carry various indicia of information as, for example, the title of the work, the artist, the publisher, and, on occasion, the lyrics.

These booklets are relatively difficult to reinsert into the case. A booklet can be easily stored in the present invention.

The jewel hard plastic boxes for compact discs are, as mentioned, unnecessarily heavy relative to the product. That makes for expensive freight costs. In addition, internal distribution of compact discs, relocation and return reprocessing for the manufacturer are further complicated by the relatively heavy hard plastic packages.

Of increasing significance is the fact that the jewel plastic containers are environmentally unsound in that the plastic does not decay over time. After breaking they are discarded and they are not recyclable. Therefore, the present invention, made from ordinary paperboard or cardstock, is a significant environmental advance in that the package is recyclable and it does not pose the environmental hazards of the jewel packages. As the jewel packages break and are discarded they pose an environmental problem whereas the present invention, even if it accidentally becomes torn or ripped can be simply discarded and recycled along with other paper products.

The present invention is a paperboard container for a compact disc. It offers many benefits to retailers, manufacturers and consumers. For example, the paperboard box is intended to be fully recyclable. A box made consistent with the present invention would be far lighter in weight than conventional hard plastic jewel type boxes for compact discs. That would, of course, reduce shipping costs. Estimated freight savings per million units of shipped discs would be achievable by the distributor, with similar savings to the chain retailer. Furthermore, the paperboard box would occupy slightly less warehouse volume than the hard plastic cases. That would increase the turnover of inventory per square foot. The package of the present invention allows for graphic material to be directly printed onto the surface of the package, even including printing on the spines or short-ends. This allows for efficient display of the titles and artists on the retail shelf space. The present invention, comprising outer container and inner sleeve, basically provides four large printable surfaces, substantially of the same size, for graphics. Up to four spines (three of the outer container, at least one of the inner sleeves) may be visible to the consumer and thus, are ideal for graphics. The present invention is a cost effective manner of providing a package including graphics on many surfaces. The same graphics can, therefore, be printed on four large surfaces and on the smaller spines.

Another benefit to consumers is the fact that the box containing the compact disc would be lighter and easier to carry around. The container would be visually more attractive with graphics and important indicia of information printed directly on all sides. The box would invite creativity and challenges to artists so that the package itself may become as important as the music of the artist impressed on the compact disc.

The new package is also intended to contain a booklet of lyrics and/or other written or printed information relating to the artist or to the work. This provides an opportunity for further marketing and for providing additional information to the ultimate consumer: The box could have a listing of the individual tracks of the compact disc legible on the outside of the package, unlike the information contained in booklets, as currently used with the jewel boxes. Those are rather difficult to reinsert into the jewel case. Furthermore, a paperboard box-like container for the compact disc would be more "user friendly" in that it would be smooth to the touch, it would have a positive tact fie feel and it would be very easy to handle. The jewel boxes are difficult to open and those not familiar with them are confused by their manner of operation and the method of removing a compact disc. The present invention would be crushable at its corners but easily uncrushed. The package would "wear in" over time and would foster sentimental attachment due to "wearing in", similar to that felt by many of the 1960's generation for their old long playing (L.P.) records and associated album covers. The present invention would allow the compact disc to be easily removed and the package would be easy to open and dose.

U.S. Pat. No. 4,850,731 shows a compact disc storage container comprising a single pocket compact disc sleeve capable of storing printed graphic materials and a compact disc. That sleeve is not as bulky as the now-available jewel boxes. According to the patent, the sleeve is preferably made from a polyester non-woven fabric which is joined to a backing sheet to provide a non-scratching, non-linting surface. It is preferred that the front sheet of the sleeve of the '731 patent be transparent so as to achieve maximum visibility of the printed surface of the compact disc. This is in contrast to the present invention. It is intended to have printing directly on the outside surface of the outer container. This, it is believed, maximizes the visual attractiveness of the overall package. The present invention, as will be more fully explained hereinafter, comprises an outer container which is capable of slidably receiving an inner sleeve in either one of two positions. As will be explained, the compact disc and any written or graphic information is first protected within the inner sleeve. In its first position within the outer container, the compact disc and graphic material are fully enclosed and sealed from the environment. After initial purchase by the consumer, the inner sleeve can be reversed and Slid within the outer container so that the compact disc and the written information is more easily and quickly accessible for use and reuse. However, while more easily accessible than the original orientation of the two components of the package, the compact disc and the written information is, even in the second orientation, substantially protected from contamination. For long term storage, the inner sleeve can be reversed, again, to its original "purchase" position so that the compact disc and any written information is more effectively blocked from contaminants. The '731 patent provides an envelope like container for selective receipt of the compact disc and the graphic material. It requires manipulation of the package in order to gain access to the disc for use and reuse. There is only a single orientation of storing the compact disc, according to the '731 patent.

U.S. Pat. No. 3,199,768 relates to a protective cover for phonograph discs. It shows a record jacket which slidably receives a record sleeve. The record sleeve is capable, of course, of holding a record. Dust and other contaminants can "attack" the record's surface when it is stored in the record sleeve, by gaining access thereto through opening 14. In addition, manipulation of the record, record sleeve and record jacket is required in order to remove the record therefrom while the present invention, in contrast, allow the user, after purchase, to have quick and easy access to the compact disc while only opening the inner sleeve. The present invention allows for the long term storage of the device with the compact disc being substantially sealed off from the environment. Thus, the present invention, by having two orientations of storage of the inner sleeve (containing the compact disc) with respect to the outer sleeve is far more versatile than the prior art.

U.S. Pat. No. 2,480,416 also relates to a record envelope and shows, in FIG. 5 a modified form which has a superficial visual resemblance to the inner sleeve of the present invention. However, the present invention provides two compartments in the inner sleeve which allows for storage of a compact disc and graphical and/or written information. Furthermore, the inner sleeve of the present invention is intended to be slid into the outer container in either of two storage positions. This is neither taught nor suggested by the '416 patent.

U.S. Pat. No. 3,404,830 shows an envelope for a gramophone record. This envelope is not intended to be inserted into an outer protective sleeve. The '830 patent shows a center opening or window 10 which allows dust and contaminants to gain access to the surface of the disc contained therein.

U.S. Pat. No. 5,096,064 shows an enclosure for information storage discs. There is neither a teaching nor a suggestion in the '064 patent of having an inner sleeve capable of assuming either one of two storage positions within an outer protective container, for storage of a circular disc.

U.S. Pat. No. 5,048,681 also relates to an envelope for storage of compact discs. Thee is no showing of an inner sleeve for the disc nor a separate compartment in the inner sleeve for storage of the written information. There is no showing in the '681 patent of an inner sleeve being capable of assuming either one of two storage positions within an outer protective container.

U.S. Pat. No. 4,473,153 relates to a flexible envelope for a diskette. U.S. Pat. No. 5,085,318 relates to a folder for holding a compact disc made from a single sheet of cart stock. U.S. Pat. Nos. 2,827,223; 5,101,973; 4,365,708; 4,852,740; 4,863032; 4,905,217; 4,905,831; 3,337,119; 4,365,708; 5,101,973; and 2,827,223 also relate to packages for round or cylindrical discs, phonograph records, etc. but again, neither teach nor suggest the use of an inner sleeve for holding both written material in one compartment and an entirely separate compartment for the compact disc, which inner sleeve is capable of sliding into either one of two storage positions within an outer container. U.S. Pat. Nos. 4,325,507; 4,349,107; and 3,279,594 are of additional background interest relating to the present invention.

SUMMARY OF THE INVENTION

The present invention is a protective package for storage of a circular article, preferably used for a compact disc having recorded indicia thereon. In its preferred embodiment the package is made from paperboard or card stock material. Graphics and other information can be printed directly thereon. In its preferred form, the package comprises two basic components, namely, an outer protective container and an inner sleeve which is slidably received within the outer container in either of two storage positions. The inner sleeve is provided with two separate compartments. A first compartment is for the compact disc and substantially protects the disc from contaminants including dust particles. The other compartment is useful for storage of written information as, for example, lyrics or other pertinent information related to the indicia recorded on the disc. The inner sleeve is provided with a disc holding mechanism. One form frictionally grips the edge of the disc. The disc will thus not fall out of the pocket but, rather, some minimum resistance must be overcome for its removal. In addition, the inner sleeve is provided with a finger grip recess so as to facilitate the removal of the disc from its compartment and the written information from its separate yet adjacent compartment. The inner sleeve is capable of being slid into the outer container and, in one orientation, the compact disc is completely sealed within the inner sleeve and outer container and, yet, in a second orientation, the compact disc, held by the inner sleeve is partially exposed, at its edge. The edge projects outwardly from a finger grip recess of the outer container so that it can be quickly and easily removed, as desired.

For a better understanding of the present invention, together with other and further objects thereof, reference is made to the following description taken in connection with the accompanying set of figures.

BRIEF DESCRIPTION OF THE DRAWINGS

FIG. 3 is another cross sectional view of the invention shown in FIG. 1, this time taken across lines 3—3 thereof;

FIG. 4 is an exploded perspective view of the present invention, the compact disc and booklet of written information;

FIG. 5 is a top plan view of the preferred embodiment of the outside container of the present invention, shown prior to the container being folded and glued into its final package-ready configuration;

DETAILED DESCRIPTION OF THE DRAWINGS AND THE PREFERRED EMBODIMENT

Figure 1:
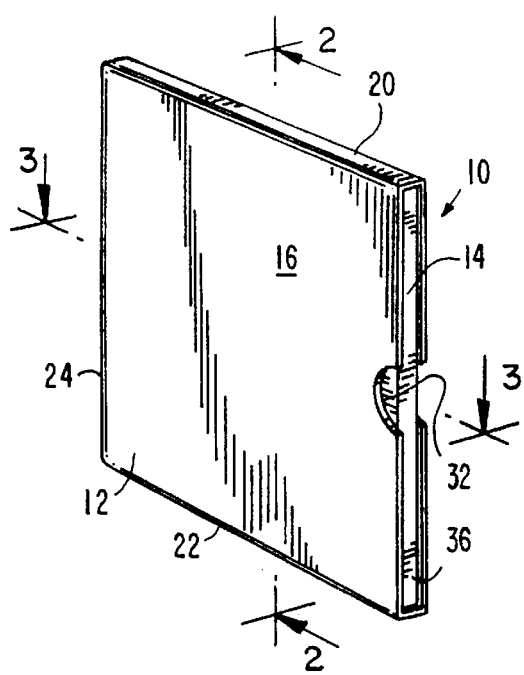
FIG. 1 is a perspective view of the present invention in its original, closed condition.
Figure 2:
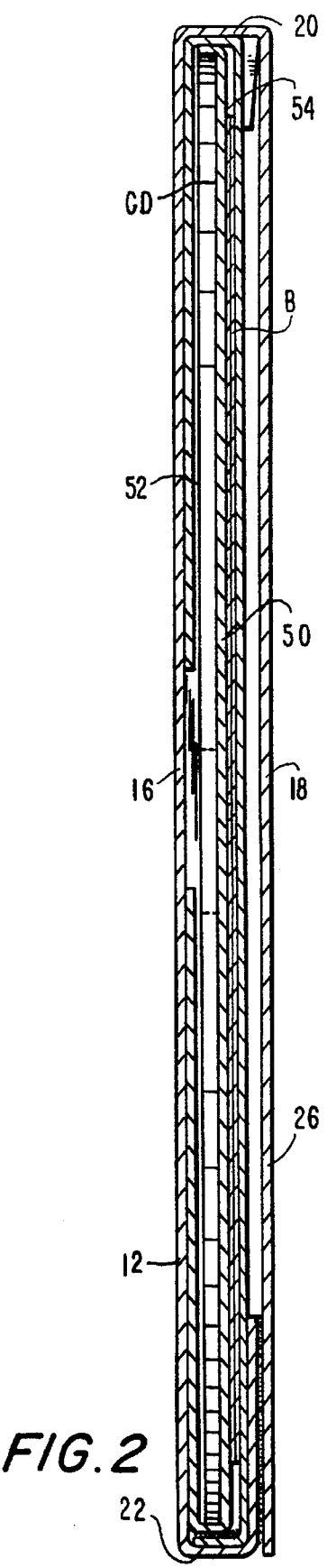
FIG. 2 is a cross sectional view taken along lines 2—2 of FIG. 1 and shows a compact disc and a booklet of written information contained therein.

A package 10 for a compact disc has an exterior cover or outer container 12 made from an originally flat sheet of card stock material. When scored, folded, glued and assembled, the card stock forms a thin box-like container for the packaging of a disc. A second sheet of card stock material can be used to form the inner sleeve 14 for the package 10. Compact disc CD (See FIGS. 2, 3 and 4) and a small booklet B, as, for example, a libretto of lyrics to the songs contained on the CD (or having other graphic or information related to the songs, the artist, etc.) are contained in separate compartments within the inner sleeve 14 prior to sliding the inner sleeve into the outer container. The package 10 containing the compact disc CD and the booklet B can be safety sealed with shrink wrap type plastic for initial consumer purchase. After purchase, the shrink wrap plastic can be easily removed and discarded.

The outer container 12, is suitable for having appropriate graphics and identifying indicia relating to the compact disc printed directly thereon. The outer container 12 comprises a flat, large front 16, a flat large rear section 18 (both 16 and 18 being substantially equal in dimension) a thin, rectangular top 20, bottom 22 and rear spine 24. The front, back, top, bottom and spine are all suitable for receipt of identifying graphics or information relating to the compact disc stored within the package. In this manner, multiple packages 10 containing compact discs, CDs, can be stored on a shelf with only their spines 24 visible and, yet, quick, visual selection is facilitated. A gluing flap 26 (visible in FIGS. 2 and 4) facilitates the construction and assembly of the outer container 12 from the single sheet of material. The leading edges 28 and 30 of the front and rear 16 and 18, respectively, of the outer container 12, are provided with cut-outs 32 and 34 to provide finger access to the inner sleeve. These cutouts facilitate the easy removal of the inner sleeve 14 from the outer container 12 by allowing a user's fingers to contact the inner sleeve 14, even when it is fully inserted into the outer container 12.

The inner sleeve 14 is also made from card stock material and is dimensioned so as to be capable of sliding into and being frictionally held within the outer container 12. According to the preferred embodiment of the present invention, the inner sleeve 14 is intended to be inserted into the outer container 12 in either of one of two alterative positions. A first position is intended for initial sale and long term storage of the compact disc and contemplates that the spine 36 of the inner sleeve 14 be substantially flush with the leading edges 28 and 30 of outer container 12. Alternatively, however, when it is more desirable to have quicker and easier access to the compact disc than total protection of the compact disc, i.e., the disc is desirably quickly accessible for play and enjoyment purposes, then the inner sleeve 14 is inserted into the outer container 12 such that the rear spine 36 abuts against and contacts the inside of rear spine 24 of the outer container 12. When so inserted, the inner sleeve 14 has its leading edges 38 substantially flush with leading edges 28 and 30 of outer container 12. The inner sleeve 14, as outer container 12, is preferably made from a single sheet of card stock material, and can be suitably scored, folded and glued according to conventionally available principles of package construction and manufacture. The inner sleeve 14 has a flat, large front wall 44, a flat, large rear wall 46, a thin top 47, a thin bottom 49 and a rear spine 36.

According to one embodiment of the present invention, best seen in FIG. 4, a large disc access recess 42 is cut into the front wall 44. This large recess 42 preferably extends a sufficient distance laterally backward from the leading edge 38 toward the rear spine 36 so that the compact disc CD can be easily removed from the inner sleeve 14 (after the inner sleeve has been first removed from the outer container 12). According to the preferred embodiment of the invention, the recess 42 extends at least half the total length of the front wall 44 so that access to the center hole CH of the compact disc CD is provided. This allows the user to place Ms or her finger into the center hole CH and to thereby easily remove the compact disc.

The inner sleeve 14 is also provided with a center dividing wall 50. It serves to separate the inner sleeve into two compartments 52 and 54 which are immediately adjacent to one another. The first compartment 52 (seen in FIG. 4) is defined by one side of dividing wall 50, the front wall 44 as well as a portion of the rear spine 36 of the inner sleeve 14. This compartment 52 is adapted to hold a compact disc CD therein. According to a preferred embodiment of the invention, a disc gripping flap 56 (folded about score lines 57 and 59), projects forwardly from the rear spine 36. The flap 56, however, only extends a short distance forwardly from the rear spine 36. The flap 56 is adapted to frictionally hold, along with the dividing wall 50, an edge of the compact disc CD. This is shown in phantom by FIG. 4. When it is desirably sought to remove the compact disc, it can be gripped and easily removed therefrom simply by overcoming the frictional resistance provided by the flap and the dividing wall 50.

Figure 7:
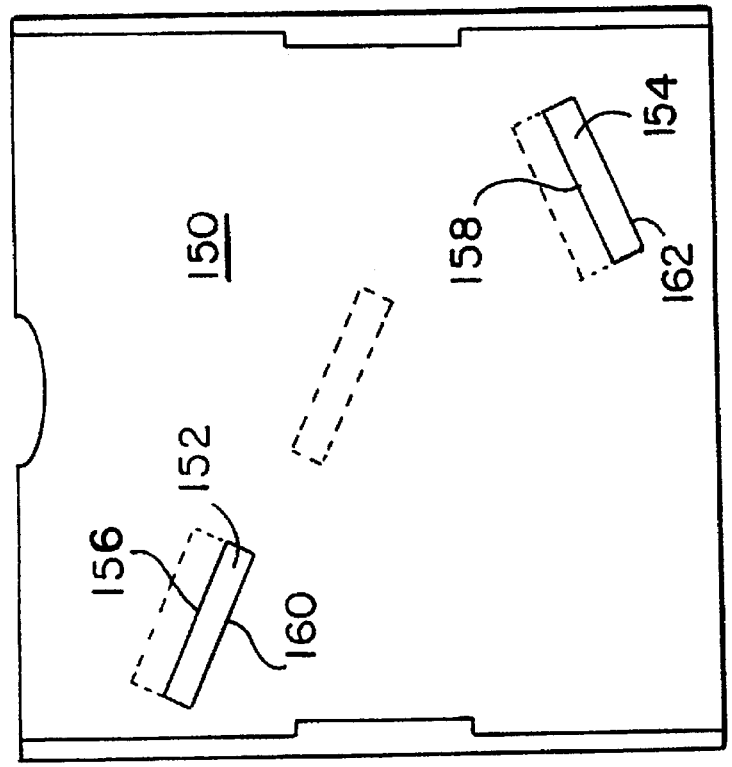
FIG. 7 is a top plan view of an alternate embodiment of the dividing wall, shown from the CD compartment.

As best seen in FIG. 7, an alternate embodiment of a dividing wall 150 is provided with a modified disc holding mechanism. Tabs 152 and 154 are cut from the dividing wall and folded along fold lines 156 and 158, toward front wall 44. The tabs provide some measure of frictional resistance to the sliding of the CD out of the compartment. The CD is frictionally held between the inside surface of the front wall and the edges 160 and 162 of the tabs 152 and 154, respectively. Tab 164 is cut into the dividing wall 150, too. It is folded along fold line 166 toward rear wall 46. It provides some measure of frictional resistance to the sliding of the booklet B out of its compartment. The booklet B is frictionally held between the inside surface of the rear wall and the edge 168 of tab 164.

Another embodiment of the invention contemplates the use of embossed ridges on both sides of the dividing wall. They extend toward the front and rear walls of the inner sleeve. A disc is thus frictionally held between the ridges on one side of the dividing wall and the inside of the front wall. A booklet is frictionally held between the ridges of the other side of the dividing wall and the inside of the rear wall.

The second compartment of the inner sleeve 14 is basically defined by the other side of dividing wall 50, a portion of the rear spine 36 (the balance thereof not defining the first compartment) and the rear wall 46. This compartment provides a separate holding chamber for a booklet of information B as, for example, a booklet of lyrics corresponding to the compact disc.

In the embodiment of the invention shown in FIG. 4, the large recess 42 is shown cut into the front wall 44 with a finger recess 60 (not shown) cut into the rear wall 46 of the inner sleeve 14. The finger recess 60 is substantially of the same dimension and relative location as finger cutout 32 so that when the inner sleeve 14 is inserted into the outer container 12, in the short-term storage condition, i.e., with the leading edge 38 of the inner sleeve 14 flush with the leading edges 28 and 30 of the front and rear wall 16 and 18, respectively, of the outer container, access to the inner sleeve is provided. This allows easy removal of the inner sleeve.

Figure 6:
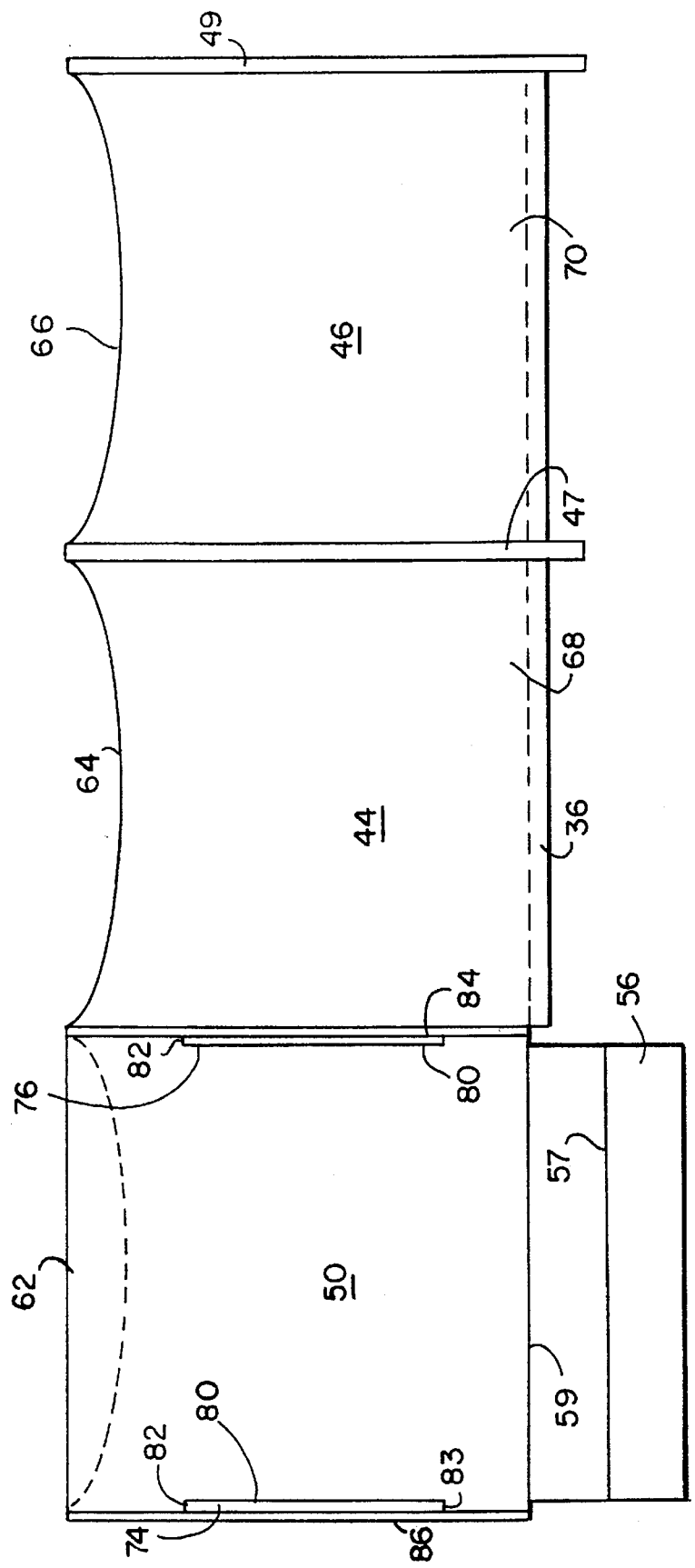
FIG. 6 is a top plan view of the inside sleeve of the preferred embodiment of the present invention, also shown prior to folding and gluing into its final package-ready condition.
Figure 8:
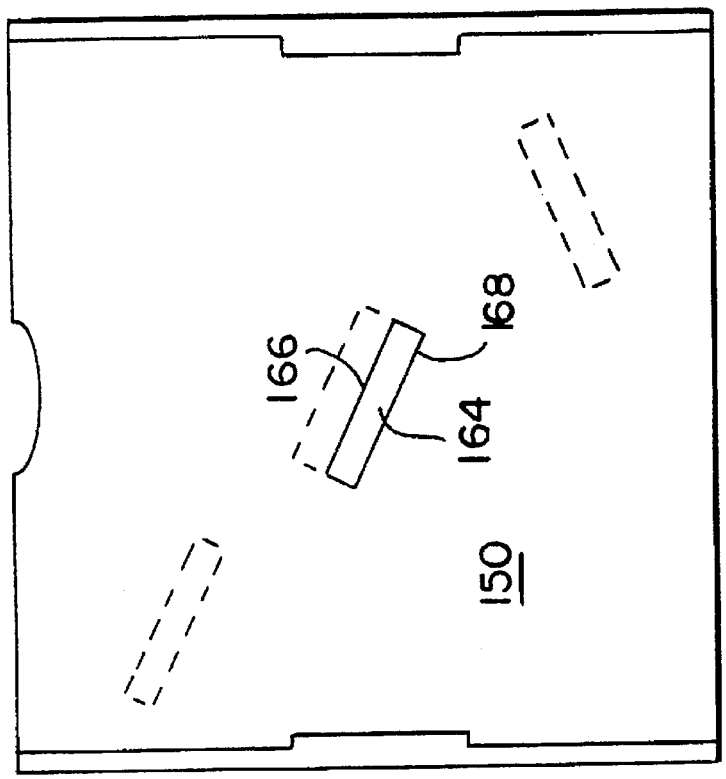
FIG. 8 is a top plan view of the same alternate embodiment of the dividing wall, shown from the booklet compartment.

According to the preferred embodiment of the present invention, the dividing wall 50 extends for substantially the entire length of the front and rear walls 44 and 46, respectively, of the inner sleeve 14 and, yet, the leading edges 38 and 40 are recessed back beyond the leading edge of the dividing wall. This is shown in FIG. 6. FIG. 5 shows the preferred embodiment of the outer container. The leading edges 28 and 30 are fully recessed, i.e., finger cut outs 32 and 34 extend from the top 20 to the bosom 22. With the inner sleeve 16 in its long term storage position, the cut-outs 32 and 34 allow for removal of the inner sleeve by direct finger contact with areas 68 and 70. With the inner sleeve in the short term storage position, cut outs 32 and 34 overlie large cut-outs 64 and 66. Access is thus provided to the CD and booklet B. Finger gripping surface 62 (see FIG. 6) is defined by the exposed dividing wall 50. This facilitates the removal of the disc and/or inner sleeve from the outer container.

Projecting laterally from the planar surface of dividing wall 50, spacing the front wall 44 therefrom, are a pair of spacing legs 74 and 76. These spacing legs serve to positively space the front wall 44 from the dividing wall and, in this manner, provide a compartment suitably dimensioned for acceptance of the compact disc. The spacing legs 74 and 76 are cut along lines 80, 82 and 83 of the originally flat card stock and folded about lines 84 and 86.

In use, the original manufacturer of the compact disc would cut, fold, glue and construct the inner sleeve and the outer container. Then, the compact disc would be slid into th,e first compartment of the inner sleeve until the edge E of the compact disc CD is frictionally held and gripped by the flap 56 and dividing wall 50. Then, if desired, a booklet B could be inserted into the second compartment of the inner sleeve. The inner sleeve, with the compact disc and/or the booklet held therein, is then slidably inserted into the outer container 12 such that the rear spine 36 of the inner sleeve is flush with the leading edges 28 and 30 of the outer container. Then, the entire package 10 is protected with shrink wrap plastic for ultimate sale to consumers.

The consumer, after purchase, removes the plastic shrink wrap material and discards the same. The compact disc can be removed from the package by first sliding inner sleeve 14 outwardly with respect to the outer container 12. This operation is facilitated by access to the inner sleeve 14 at finger cutouts 32 and 34. Then, with the inner sleeve fully exposed from the confines of the outer container, the compact disk CD can be easily removed from the inner sleeve since access to the center hole CH of the compact disc is provided by large recess 42. The compact disc can then be used on an appropriate compact disc player. In addition, access to the booklet B is also provided and, to this end, the finger recess in the rear wall of the inner sleeve facilitates access thereto. After the compact disc is played and if long term storage is desired, the compact disc is reinserted back into the inner sleeve such that the edge E of the compact disc is frictionally held by cooperation of the flap 56 and the dividing wall 50. The compact disc is frictionally held therebetween and prevented from accidentally slipping out. The booklet, too, can be reinserted into the second compartment, as desired. The inner sleeve, now containing the compact disc and/or the booklet, can then be slid within the outer container 12 until the rear wall 36 of the inner sleeve 14 is flush with the leading edges 28 and 30 of the outer container 12. This is suitable for long-term storage.

Alternatively, however, if short term storage of the CD is desired, then the inner sleeve 16 with the CD and booklet in their compartments can be turned around such that the rear spine 36 "leads" the inner sleeve 14 into the outer container 12 and the inner sleeve is then slid into the outer container until the leading edges 38 and 40 of the inner sleeve are substantially flush and coplanar with the leading edges 28 and 30 of the outer container. This allows for quick access to the compact disc and the booklet, too.

This invention has been described with a preferred embodiment, but other variations of the invention will be apparent to those of ordinary skill in the art without departing from the scope of the invention that is set forth in the appended claims.

I claim as follows:

1. A package for a disk and written materials comprising:

(a) an outer jacket comprising a first pair of opposed, rigid side walls, connected together along three edges and having a common back member, said side walls defining an opening slot at their free edges opposed to said back member; said three edges of said outer jacket being sized to permit identification of the disk to be imprinted on one or all of said edges;

(b) an inner sleeve comprising a second pair of opposed side walls connected together along three edges and having a spine element, said inner sleeve also comprising a dividing wall between said second pair of opposed side walls and defining a first compartment for snugly holding and substantially enveloping a disk between said dividing wall and a first of said second pair of opposed side walls, and a separate second compartment for holding written materials between said dividing wall and the second of said second pair of opposed side walls, said dividing wall having a rear edge and a leading edge, said free edges of said second pair of opposed side walls and said leading edge of said dividing wall defining a pair of adjacent openings for said first and second compartments, said openings being opposed to said spine element; said outer jacket being dimensionally slightly greater than said inner sleeve to snugly house the inner sleeve, and said inner sleeve being alternatively slidably received within said outer jacket in two positions, namely, a first position defined by the spine element of said inner sleeve being in mating engagement with said opening slot of said outer jacket for long term storage wherein a disk and written materials are substantially sealed from the environment and a second position for short term storage and quick individual access to both a disk in said first compartment and written materials in said second compartment, said second position being defined by said spine element of said inner sleeve being proximal to said back member of said outer jacket, and said openings of said first and second compartments of said inner sleeve being located at said opening slot of said outer jacket.

2. A package as claimed in claim 1 wherein said outer jacket is made from a single sheet of card-stock material.

3. A package as claimed in claim 1 wherein said inner sleeve is made from a single sheet of cord stock material.

4. A package as claimed in claim 1 wherein said inner sleeve is provided with a disk holding means for frictionally engaging at least a section of the edge of a disk.

5. A package as claimed in claim 4 where said disk holding means comprises a holding tab extending along said spine element of said inner sleeve and the rear edge of said dividing wall.

* * * * *